United States Patent [19]

Saho et al.

[11] Patent Number: 4,992,521

[45] Date of Patent: Feb. 12, 1991

[54] ORGANOSILOXANE AND PROCESS FOR PREPARING THE SAME

[75] Inventors: Takahiro Saho; Yoshinori Akutsu; Takaharu Nakano; Nobumasa Ohtake, all of Yokohama, Japan

[73] Assignee: Chisso Corporation, Japan

[21] Appl. No.: 341,225

[22] Filed: Apr. 21, 1989

[30] Foreign Application Priority Data

Apr. 22, 1988 [JP] Japan .................................. 63-99686

[51] Int. Cl.$^5$ .............................................. C08G 77/06
[52] U.S. Cl. ......................................... 528/14; 528/37; 528/42; 556/454; 556/462; 556/488
[58] Field of Search ...................... 556/454, 462, 488; 528/42, 37, 14

[56] References Cited

U.S. PATENT DOCUMENTS 3,146,251 8/1964 Brown et al. ....................... 556/454
4,658,049 5/1987 Nakano et al. ...................... 556/437

*Primary Examiner*—Melvyn I. Marquis
*Attorney, Agent, or Firm*—Leydig, Voit & Mayer

[57] ABSTRACT

The present invention relates to an organosiloxane compound suitable for the modification of silicone rubbers and synthetic resins, an organosiloxane compound useful as its intermediate, and a process for preparing them.

The organosiloxane compound of the present invention can be represented by the general formula (IV)

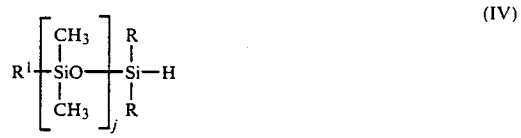

(IV)

wherein j is an integer of 1 to 2000, R is an alkyl group having 1 to 4 carbon atoms, and $R^1$ is a pentafluorophenyl group or a straight-chain or a branched fluoroalkyl group represented by the formula (III)

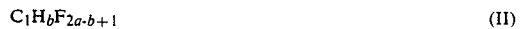

$C_lH_bF_{2a-b+1}$   (II)

wherein a is an integer of 3 to 18, and b is an integer of 0 to 2a.

The siloxane compound of the present invention has a siloxane chain each having a substituent with a fluorine atom containing group at the terminal thereof. Each of molecules constituting the polysiloxane compound of the present invention has a terminal hydrosilyl group portion and a fluorine atom-containing terminal substituent portion therein. Since the reactive group of the hydrosilyl group is chemically bonded to the synthetic resins, the deterioration in characteristics with time can be hindered. The synthetic resins can be provided with the specific function of the fluoroalkyl group without impairing characteristics which the polysiloxane has.

15 Claims, 2 Drawing Sheets

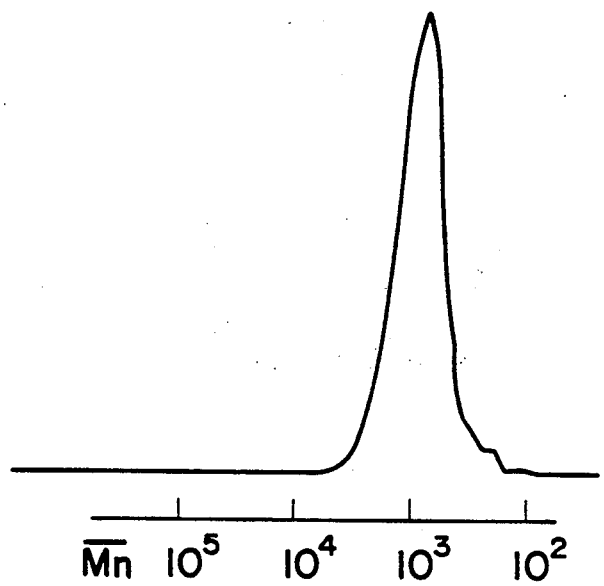
F I G. 1
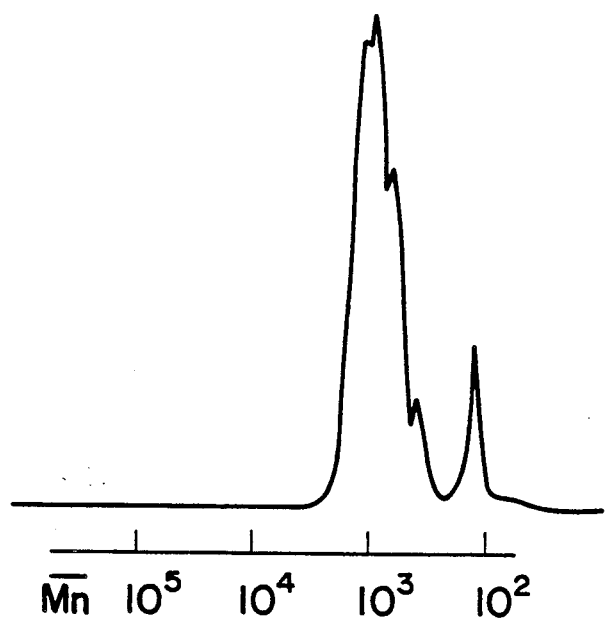
F I G. 2

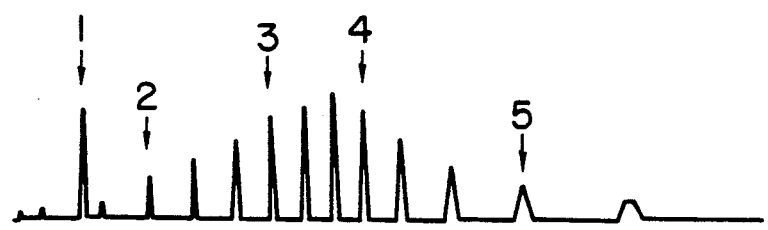
F I G. 3
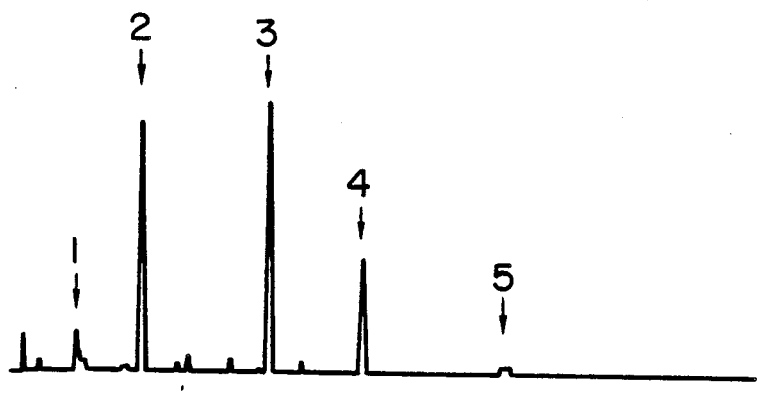
F I G. 4

ORGANOSILOXANE AND PROCESS FOR PREPARING THE SAME

BACKGROUND OF THE INVENTION (1) Field of the Invention

The present invention relates to a novel organosiloxane compound suitable for the modification of silicone rubbers and synthetic resins, a novel organosiloxane compound useful as an intermediate, and a process for preparing them.

(2) Description of the Prior Art

Heretofore, a fluorine-containing group has been introduced into silicone rubbers for the purpose of improving oil resistance and solvent resistance. A typical example of the fluorine-containing group is a 3,3,3-trifluoropropyl group, and the fluorine-containing group is usually introduced into a pendant site (branch site of a polysiloxane chain). Such fluorosilicone rubbers have been used singly and in the form of blends and copolymers of these rubbers and ordinary silicone rubbers.

Furthermore, siloxane resins have been used in synthetic resins with the intention of providing the synthetic resins with interfacial characteristics such as repellency, release properties and stain resistance as will as other characteristics such as heat resistance which siloxane compounds have. In these silicone resins, the straight-chain polysiloxane compounds are mainly used. The polysiloxane compound not having any group which is reactive with a synthetic resin is introduced into the synthetic resin by blending them, and the polysiloxane compound having a group which is reactive with a group present in the synthetic resin is introduced thereinto by a chemical bond. The polysiloxane compound can also be used as a raw material of graft polymers for the modification of the synthetic resin to which much attention is paid of late, and particularly in this case, the so-called one terminal-modified polysiloxane compound has been used in which one terminal alone has a reactive group and another terminal is terminated with a trimethylsiloxy group.

The polysiloxane having the functional group only at the one terminal may be prepared by hydrolyzing an organic dichlorosilane or utilizing an equilibrating reaction between a cyclosiloxane and a terminal terminator which is a usual manufacturing process for the polysiloxane. However, this method has the drawbacks that it is hard to obtain the products having a narrow molecular weight distribution, and that it is difficult to attach the functional group only to the one terminal. In place of this method, another method (Japanese Patent Laid-open Publication Nos. 78236/1984 and 275329/1986) has been employed which comprises anion polymerizing of a cyclosiloxane by the use of a trialkylsilanolate compound of an alkaline metal as an initiator, and then reacting the resulting polymer with a trialkylchlorosilane having the desired functional group so as to attach the functional group to the one terminal thereof.

However, when the fluorine-containing substituent is introduced into the pendant site as in conventional silicone rubbers, the fluorine-containing substituent is uniformly present in molded or coated products, and therefore a great deal of the fluorine-containing substituent is required to obtain the expected effect. In addition, there are also troubles due to poor miscibility and a problem such as the adverse influence of the substituents on other physical properties.

Also, when the siloxane compound not having any reactive group for the synthetic resin is used for the purpose of improving the specific characteristics of the synthetic resin, the improvement depends upon the function of the polysiloxane. Thus, the degree of improvement to the synthetic resin is insufficient in view of the fact that the demand of the specific characteristics is now increased. Moreover, in order to obtain the characteristics sought, a great deal of the polysiloxane compound is required, which leads to the problem that the other physical properties are adversely affected. The one terminal-modified siloxane compound also has similar disadvantages, because the other terminal of the molecular chain which has no reactive group for the synthetic resin is terminated with a trimethylsiloxy group. In addition, specific properties such as oil repellency are scarcely improved by the dimethylsiloxane compound alone in which the other terminal is terminated with the trimethylsiloxy group. Also, in the case of a compound having a fluoroalkyl group in its molecule but not having any reactive group for the synthetic resin in the molecule, the specific characteristics deteriorate noticeably with time, and this kind of compound cannot sufficiently provide the resin with the characteristics sought and cannot conveniently be used in graft polymers.

In a conventional manufacturing process of the one terminal-modified siloxane, a trialkylsilanolate is used as an initiator, and thus an additional step is necessary in which a trialkylsilanol is reacted with an alkali metal compound to produce the trialkylsilanolate. In addition, this alkali metal compound (usually a lithium catalyst), which is expensive, is used in an amount equivalent to the trialkylsilanol, and the smaller the molecular weight of the polysiloxane product is and the greater the production of the polysiloxane is, the greater the required amount of the catalyst is. In consequence, the cost of the prepared siloxane compound is high, and for this reason, uses of the siloxane compound are limited.

SUMMARY OF THE INVENTION

An object of the present invention is to provide a novel siloxane compound having a fluoroalkyl group at one molecular chain terminal thereof and a reactive group at the other molecular chain terminal in its one molecule, and another object of the present invention is to provide a process for preparing this siloxane compound inexpensively. According to the present invention, the above-mentioned problems can be solved.

The present inventors have intensively conducted research to achieve the above-mentioned objects, and they have prepared a compound represented by the following general formula (I); a siloxane compound obtained by making the compound as the intermediate having a fluorine atom-containing substituent at the $\alpha$-position, the $\alpha$-position or $\alpha'$-position, or the $\alpha$-position, $\alpha'$-position or $\alpha''$-position and having a hydroxilyl group at the $\omega$-position; and a process for preparing these compounds.

That is, the first feature of this invention is directed to a siloxane compound represented by the general formula (I)

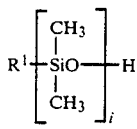
(I)

wherein i is an integer of 4 to 2000, and $R^1$ is a pentafluorophenyl group or a substituent which is a straight-chain or a branched fluoroalkyl group represented by the formula (II)

$$C_aH_bF_{2a-b+1} \tag{II}$$

wherein a is an integer of 3 to 18, and b is an integer of 0 to 2a.

The second feature of this invention is directed to a siloxane compound represented by the general formula (I) regarding the first feature of this invention in which the substituent represented by $R^1$ is a 3,3,3-trifluoropropyl group, a tridecafluoro-1,1,2,2-tetrahydrooctyl group or a heptadecafluoro-1,1,2,2-tetrahydrodecyl group.

The third feature of this invention is directed to a process for preparing a siloxane compound represented by the general formula (I) regarding the first invention which comprises the step of anion polymerizing hexamethylcyclotrisiloxane using of a trialkylsilanol represented by the general formula (III)

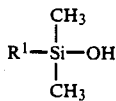
(III)

wherein $R^1$ is a pentafluorophenyl group or a substituent which is a straight-chain or a branched fluoroalkyl group represented by the formula (II)

$$C_aH_bF_{2a-b+1} \tag{II}$$

wherein a is an integer of 3 to 18, and b is an integer of 0 to 2a, as an initiator in the presence of a lithium catalyst in an amount of 0.05 to 50 mole % based on the initiator in a polar solvent having no active hydrogen.

The fourth feature of this invention is directed to a siloxane compound represented by the general formula (IV)

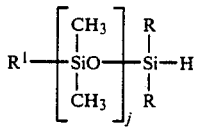
(IV)

wherein j is an integer of 1 to 2000, R is an alkyl group having 1 to 4 carbon atoms, and $R^1$ is a pentafluorophenyl group or a substituent which is a straight-chain or a branched fluoroalkyl group represented by the formula (II)

$$C_aH_bF_{2a-b+1} \tag{II}$$

wherein a is an integer of 3 to 18, and b is an integer of 0 to 2a.

The fifth feature of this invention is directed to a siloxane compound represented by the general formula (IV) regarding the fourth feature of this invention in which the substitutent represented by $R^1$ is a 3,3,3-trifluoropropyl group, a tridecafluoro-1,1,2,2-tetrahydrooctyl group or a heptadecafluoro-1,1,2,2-tetrahydrodecyl group.

The sixth feature of this invention is directed to a siloxane compound represented by the general formula (V)

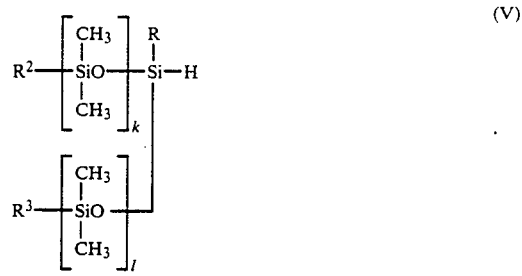
(V)

wherein each of k and l is an integer of 1 to 2000, R is an alkyl group having 1 to 4 carbon atoms, and each of $R^2$ and $R^3$ is an alkyl group having 1 to 4 carbon atoms, a pentafluorophenyl group or a substituent which is a straight-chain or a branched fluoroalkyl group represented by the formula (II)

$$C_aH_bF_{2a-b+1} \tag{II}$$

wherein a is an integer of 3 to 18, and b is an integer of 0 to 2a, and at least one of $R^2$ and $R^3$ is a fluorine atom-containing substituent other than the aforesaid alkyl group.

The seventh feature of this invention is directed to a siloxane compound represented by the general formula (V) regarding the sixth feature of this invention in which the substitutent represented by each of $R^2$ and $R^3$ is an alkyl group having 1 to 4 carbon atoms, a 3,3,3-trifluoropropyl group, a tridecafluoro-1,1,2,2-tetrahydrooctyl group or a heptadecafluoro-1,1,2,2-tetrahydrodecyl group, and at least one of $R^2$ and $R^3$ is a fluorine atom-containing substituent other than the aforesaid alkyl group.

The eighth feature of this invention is directed to a siloxane compound represented by the general formula (VI)

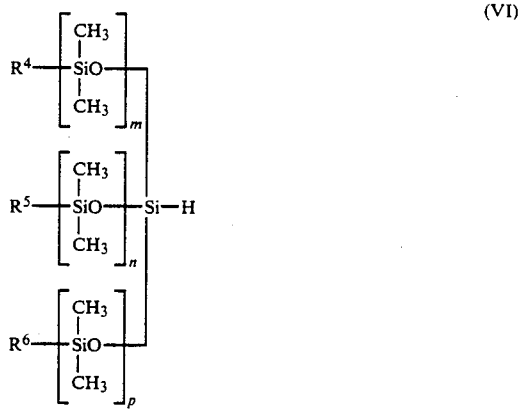
(VI)

wherein each of m, n and p is an integer of 1 to 2000, and a substituent represented by each of $R^4$, $R^5$ and $R^6$ is an alkyl group having 1 to 4 carbon atoms, a pentafluorophenyl group or a substituent which is a straight-chain or a branched fluoroalkyl group represented by the formula (II)

$C_aH_bF_{2a-b+1}$ (II)

wherein a is an integer of 3 to 18, and b is an integer of 0 to 2a, and at least one of $R^4$, $R^5$ and $R^6$ is a fluorine atom-containing substituent other than the aforesaid alkyl group.

The ninth feature of this invention is directed to a siloxane compound represented by the general formula (VI) regarding the eighth feature of this invention in which the substitutent represented by each of $R^4$, $R^5$ and $R^6$ is an alkyl group having 1 to 4 carbon atoms, a 3,3,3-trifluoropropyl group, a tridecafluoro-1,1,2,2-tetrahydrooctyl group or a heptadecafluoro-1,1,2,2-tetrahydrodecyl group, and at least one of $R^4$, $R^5$ and $R^6$ is a fluorine atom-containing substituent other than the aforesaid alkyl group.

The tenth feature of this invention is directed to a process for preparing a siloxane compound represented by the general formula (IV) regarding the fourth feature of this invention which comprises the step of reacting a compound represented by the general formula (I')

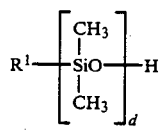

wherein d is an integer of 1 to 2000 and $R^1$ is a pentafluorophenyl group or a substituent which is a straight-chain or a branched fluoroalkyl group represented by the formula (II)

$C_aH_bF_{2a-b+1}$ (II)

wherein a is an integer of 3 to 18, and b is an integer of 0 to 2a, with a chlorosilane represented by the general formula (VII)

 (VII)

wherein R is an alkyl group having 1 to 4 carbon atoms.

The eleventh feature of this invention is directed to a process for preparing a siloxane compound represented by the general formula (V) regarding the sixth feature of this invention or a siloxane compound represented by the general formula (VI) regarding the eighth feature of the subject invention which comprises the step of reacting a compound or a mixture of two or more compounds represented by the general formula (I') in the tenth feature of this invention, or a mixture of a compound represented by the general formula (I') and one or more kinds of compounds represented by the general formula (VIII)

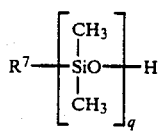

wherein q is an integer of 1 to 2000 and $R^7$ is an alkyl group having 1 to 4 carbon atoms, with a chlorosilane represented by the general formula (IX)

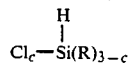 (IX)

wherein c is an interger of 2 or 3 and R is an alkyl group having 1 to 4 carbon atoms.

The twelfth feature of this invention is directed to a process for preparing a siloxane compound represented by the general formula (IV) regarding the fourth feature of this invention, a siloxane compound represented by the general formula (V) regarding the sixth feature of this invention or a siloxane compound represented by the general formula (VI) regarding the eighth feature of this invention which comprises the steps of anion polymerizing hexamethylcyclo-trisiloxane using one kind or a mixture of two or more kinds of trialkylsilanols represented by the general formula (III) in the third feature of this invention, or a mixture of the trialkylsilanol represented by the general formula (III) and one or more kinds of trialkylsilanols represented by the general formula (X)

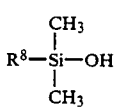 (X)

wherein $R^8$ is an alkyl group having 1 to 4 carbon atoms, as an initiator in the presence of a lithium catalyst in an amount of 0.05 to 50 mole % based on the initiator in a polar solvent having no active hydrogen; and then terminating the chain of the resulting polymer with a chlorosilane represented by the general formula (IX)

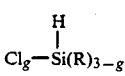 (IX)

wherein g is an interger of 1 to 3 and R is an alkyl group having 1 to 4 carbon atoms.

The thirteenth feature of this invention is directed to a process for preparing a siloxane compound according to the third or the twelfth feature of this invention wherein the lithium catalyst is metallic lithium, butyl lithium, lithium hydroxide, a lithium trialkylsilanolate represented by the general formula (XI)

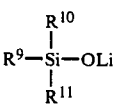 (XI)

wherein each of $R^9$, $R^{10}$ and $R^{11}$ is an alkyl group having 1 to 4 carbon atoms, a phenyl group, a pentafluorophenyl group, or a straight-chain or a branched fluoroalkyl group represented by the formula (II)

$C_aH_bF_{2a-b+1}$ (II)

wherein a is an integer of 3 to 18, and b is an integer of 0 to 2a, or a mixture of two or more thereof.

The fourteenth feature of this invention is directed to a process for preparing a siloxane compound according to the third, the twelfth or the thirteenth feature of this invention wherein the amount of the lithium catalyst is in the range of 0.05 to 10 mole % based on the trialkylsilanol which is the polymerization initiator.

The fifteenth feature of this invention is directed to a process for preparing a siloxane compound according to the third, the twelfth, the thirteenth or the fourteenth feature of this invention wherein the polar solvent having no active hydrogen is tetrahydrofuran, 1,4-dioxane, ethylene glycol dimethyl ether, diethylene glycol dimethyl ether, dimethylformamide, dimethyl sulfoxide or a mixture of two or more thereof.

BRIEF DESCRIPTION OF THE DRAWINGS

FIG. 1 shows a gel permeation chromatogram of siloxane compounds prepared by the present invention.

FIG. 2 shows a gel permeation chromatogram of siloxane compounds prepared by a conventional process.

FIG. 3 shows a gas chromatogram of the siloxane compounds represented by the gel permeation chromatogram of FIG. 1.

FIG. 4 shows a gas chromatogram of the siloxane compounds represented by the gel permeation chromatogram of FIG. 2.

DETAILED DESCRIPTION OF THE INVENTION

A compound represented by the general formula (I) regarding the first feature of this invention is characterized by having a terminal silanol group portion and a terminal substituent portion with a fluorine atom simultaneously in one molecule thereof, as is apparent from the general formula (I). This constitution is maintained even in the high-molecular weight polymer in which i of the general formula (I) has a high value, and each of the molecules constituting the polymer has the terminal silanol group portion and the terminal substituent portion with the fluorine atom in the one molecule thereof. Additionally, the polymer of the present invention is characterized in that its dispersity is in a preferable case, from 1.1 to 1.2, which means that the distribution of the molecular weight is controlled very well.

The parameter i in the compound of the general formula (I) indicates the number of dimethylsiloxane units in a polydimethylsiloxane straight-chain portion, and the value of i is preferably in the range of 4 to 2000 so as to surely exert the specific function of the polydimethylsiloxane when the compound (I) is introduced into a silicone rubber or a synthetic resin, to facilitate the introduction of the compound (I) into the synthetic resin, and to facilitate the synthesis of the compound (I) itself. Furthermore, in the fluoroalkyl group represented by the formula (II) regarding the first feature of this invention, the parameter a is preferably in the range of 3 to 18 for the sake of the easy availability of a raw material, the effective exertion of the function which the fluoroalkyl group has, and the ease of synthesis of the group (II).

When the compound of the present invention, either having or not having a substituent, is introduced into the synthetic resin, the value of i in the compound having the general formula (I) is preferably 700 or less, depending upon the kind and characteristics of the synthetic resin and the desired function.

The compound represented by the general formula (I) regarding the first feature of this invention can be used as an intermediate at the time of the synthesis of the compound represented by the general formula (IV) of the fourth feature of this invention, the general formula (V) of the sixth feature of this invention or the general formula (VI) of the eighth feature of this invention. In addition, the compound represented by the general formula (I) regarding the first feature of this invention can be itself used as a siloxane compound which is useful for the improvement of the specific characteristics of a synthetic resin such as a polyurethane or a polyester, and in this case, the hydroxyl group present at one terminal of the molecule is reacted with the synthetic resin capable of reacting with the hydroxyl group, so that the compound is incorporated therein by a chemical bond.

The siloxane compound represented by the general formula (IV) of the fourth feature of this invention, the general formula (V) of the sixth feature of this invention or the general formula (VI) of the eighth feature of this invention is characterized by having the terminal hydrosilyl group portion and the terminal substituent portion with a fluorine atom simultaneously in one molecule thereof, as shown in each general formula. This constitution is maintained even in the high-molecular weight polymer in which j in the general formula (IV), k and l in the general formula (V), or m, n and p in the general formula (VI) have a high value, and each of the molecules constituting the polymer has the terminal hydrosilyl group portion and the terminal substituent portion with the fluorine atom in the one molecule thereof. Additionally, the polymer of the present invention is characterized in that its dispersity is in a preferable case, from 1.1 to 1.2, which means that the distribution of the molecular weight is controlled very well. Each parameter of j, k, l, m, n and p in the general formulae (IV), (V) and (VI) indicates the number of dimethylsiloxane units in a polydimethylsiloxane straight-chain portion, and the value of each parameter is preferably in the range of 1 to 2000 so as to surely exert the specific function of the polydimethylsiloxane when the compound of the present invention is introduced into a silicone rubber or a synthetic resin, to facilitate the introduction of the compound into the synthetic resin, and to facilitate the synthesis of the compound itself.

When the compound either having or not having a substituent, which is represented by each of the general formula (IV) regarding the fourth feature of this invention, the general formula (V) regarding the sixth feature of this invention and the general formula (VI) regarding the eighth feature of this invention, is introduced into the silicone rubber or the synthetic resin, each value of j, k, l, m, n and p in the general formulae (IV), (V) and (VI) is most preferably 700 or less, depending upon the kind, characteristics and a desired function of the silicone rubber or the synthetic resin.

Furthermore, int he fluoroalkyl group represented by the formula (II) in the fourth, the sixth and the eighth features of this invention, the parameter a is preferably in the range of 3 to 18 for the sake of the easy availability of a raw material, the effective exertion of the function which the fluoroalkyl group has, and the ease synthesis of the group (II).

The siloxane compound of the present invention is characterized by three kinds of structures. That is, the siloxane compound represented by the general formula (IV) of the fourth invention has one siloxane chain, the compound represented by the general formula (V) of the sixth feature of this invention has two siloxane chains, and the compound represented by the general formula (VI) of the eighth feature of this invention has three siloxane chains on the basis of a hydroxilyl group. Therefore, the above-mentioned structure of the siloxane compound can be optionally selected in compliance with the kind and desired functional properties of silicone rubber or synthetic resin.

In the compound represented by the general formula (V) or (VI) of the sixth or the eighth feature of this invention, the respective siloxane chains preferably have the same chain length in most of the cases where the siloxane compound is used as a graft polymer to modify the silicone rubber or the synthetic resin. However, the siloxane compound can have different molecular chain lengths in accordance with a particular purpose. The substituents represented by $R^2$ and $R^3$ in the general formula (V) having the two molecular chains and the substituents represented by $R^4$, $R^5$ and $R^6$ in the general formula (VI) having the three molecular chains may be different from each other. However, except the case that it is necessary to provide the silicone rubber or the synthetic resin with a specific function or except for the case that it is necessary to finely control the characteristics, the compound preferably has the same siloxane chain length and the same substituents, because if they are not the same, manufacturing steps increase and the tolerance of synthetic conditions is restricted.

The compound of the present invention represented by the general formula (IV) of the fourth feature of this invention, the general formula (V) of the sixth feature of this invention or the general formula (VI) of the eighth feature of this invention can be used as a raw material of a modifier for silicone rubbers which can be obtained by reacting the hydrosilyl group present in the molecule of the compound with another siloxane compound containing a vinyl group, and can be also used as a modifier for .α-polyolefin synthetic resins capable of reacting with the hydrosilyl group present in the compound molecule of the present invention. The compound of the present invention can be used as an intermediate for a siloxane compound, because a substituent which is reactive with a desired synthetic resin can be introduced into the compound of the present invention by a hydrosilyl-forming reaction, whereby new characteristics can be added to the desired synthetic resin.

The trialkylsilanol used as the initiator for the anion polymerization which is represented by the general formula (III) of the third feature of this invention or the general formula (X) of the twelfth feature of this invention is easily available by hydrolyzing a trialkylchlorosilane having a desired alkyl group. Examples of the trialkylchlorosilane include trimethylchlorosilane, ethyldimethylchlorosilane, n-butyldimethylchlorosilane, t-butyldimethylchlorosilane, isopropyldimethylchlorosilane, n-propyldimethylchlorosilane, pentafluorophenyldimethylchlorosilane, 3,3,3-trifluoropropyldimethylchlorosilane, (tridecafluoro-1,1,2,2-tetrahydrooctyl) dimethylchlorosilane and (heptadecafluoro-1,1,2,2-tetrahydrodecyl) dimethylchlorosilane.

Examples of the lithium catalyst used in synthesizing the compound of the present invention include metallic lithium, butyl lithium, lithium hydroxide and lithium trialkylsilanolates represented the following general formula (XI), and they can be used singly or as a mixture of two thereof.

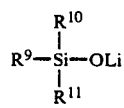

(XI)

wherein each of $R^9$, $R^{10}$ and $R^{11}$ is an alkyl group having 1 to 4 carbon atoms, a phenyl group, a pentafluorophenyl group or a straight-chain or a branched fluoroalkyl group represented by the formula (II)

wherein a is an integer of 3 to 18, and b is an integer of 0 to 2a.

Catalysts other than these lithium catalysts, for example, alkali metal compounds such as sodium catalysts and potassium catalysts are also usable, but when this kind of catalyst is used to form the desired siloxane compound represented by the general formula (I) of the first feature of this invention, the general formula (IV) of the fourth feature of this invention, the general formula (V) of the sixth feature of this invention or the general formula (VI) of the eighth feature of this invention, the yield of the product is low. In consequence, the catalysts other than the lithium catalysts are improper in the synthesis of the compound regarding the present invention.

The amount of the catalyst is preferably in the range of 0.05 to 50 mole %, more preferably 0.05 to 10 mole %, based on the trialkylsilanol which is the polymerization initiator. When the amount of the catalyst is less than the lower limit of 0.05 mole %, the rate of the polymerization is too low and impractical. The upper limit of the amount of the catalyst is 50 mole % or less, preferably 10 mole % or less, when a small amount of the catalyst is used in the synthesis on a small scale and in the production of the compound having a high molecular weight, i.e., when it is difficult to precisely measure the catalyst. Even if the amount of the catalyst is in excess of 50 mole %, a higher effect cannot be expected, and the use of the dangerous catalyst in an amount beyond the necessary level leads to a decrease in safety, a drop in manufacturing efficiency and a rise of manufacturing cost.

When the polysiloxane compound is synthesized by living polymerization under conditions in which the lithium catalyst is used in an amount of 50 mole % or less, based on the trialkylsilanol which is the polymerization initiator, in accordance with a preparation process of the present invention, the thus synthesized polysiloxane compound has the feature that the polymer is densely constituted of the molecules each containing dimethylsiloxane units, the number of which can vary one by one. In the polysiloxane compound synthesized by the conventional process, the polymer is constituted of the molecules containing siloxane units of the cyclic siloxane which is a raw material, and the number of the silioxane units varies by several. For example, when hexamethylcyclotrisiloxane having three siloxane units is used as the raw material, most of the molecules constituting the obtained polymer contain siloxane units the number of which varies by three. This can be easily confirmed by gas chromatography, liquid chromatogrphy (gel permeation chromatography) or the like. FIGS. 1 and 2 show gel permeation chromatograms of siloxane compounds having a molecular weight of 1,000 which were synthesized by the preparation process of the present invention (the lithium catalyst was used in an amount of 1.0 mole % based on the trialkylsilanol) and the conventional manufacturing process (the trialkylsilanol and the lithium catalyst were each used in an equimolar amount) under the same conditions except for the amounts of the catalysts. FIGS. 3 and 4 are the gas chromatograms of the compounds which correspond to those of FIGS. 1 and 2. Peaks to in FIGS. 3 and 4 correspond to the following compounds:

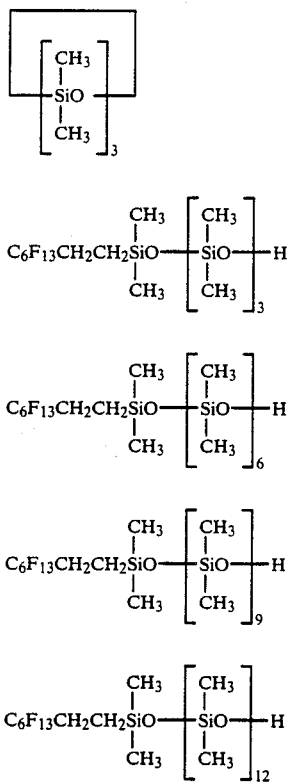

In FIG. 1 showing the chart of the compound synthesized in accordance with the process of the present invention, one definite peak is present, because the polymer is composed of one by one siloxane unit and is not separated by the gel permeation chromatography. On the contrary, in FIG. 2 showing the chart of the compound synthesized by the conventional process, a plurality of peaks are present. Furthermore, in contrast to the chart of the compound synthesized by the preparation process of the present invention, FIG. 3, the chart concerning the compound obtained by the conventional process, FIG. 4 indicates that tall peaks of the siloxane units are present in every third place. This elucidates that as the amount of the lithium decreases from the equivalent amount of the trialkylsilanol, a ratio of two short peaks between the tall peaks to the latter tall peaks in FIG. 4 changes from the peak distribution of FIG. 4 in which the two short peaks are present between the tall peaks, to that of FIG. 3 in which the peaks corresponding to the two short peaks in FIG. 4 are tall.

In principle, gas chromatography cannot analyze samples which do not gasify at a certain temperature. Therefore, the greater the molecular weight of the polymer is, the harder the gasification is, and in FIGS. 3 and 4, the height of the peaks on the low-molecular side is not proportional to that of the peaks on the high-molecular side (the peaks on the right side of FIGS. 3 and 4 denote the polymers having higher molecular weights), and therefore the peaks shown in FIGS. 3 and 4 do not always indicate a quantitative ratio of the polymers. Accordingly, it is impossible to determine the distribution of molecular weight from the gas chromatograms of FIGS. 3 and 4. The molecular weight distributions of the polymers are indicated by the gel permeation chromatograms (FIGS. 1 and 2).

Suitable examples of polar solvent not having any active hydrogen which is used in the synthesis of the present invention include tetrahydrofuran, 1,4-dioxane, ethylene glycol dimethyl ether, diethylene glycol dimethyl ether, dimethylformamide and dimethyl sulfoxide, and they may be used singly or in combination. Above all, tetrahydrofuran is particularly preferable. When a solvent having active hydrogen is used, the reaction is hindered, and when a non-polar solvent is used, the reaction scarcely proceeds. Therefore, the employment of these kinds of solvents is not preferable.

Reaction temperature is preferably in the range of 0° to 50° C., more preferably 15° to 25° C. When the reaction temperature is less than 0° C., the rate of the polymerization is low and impractical; when it is more than 50° C., the molecular weight distribution of the produced polysiloxane is too high.

Reaction time depends upon the reaction temperature, and it is preferred that the reaction be brought to an end when about 95% of hexamethylcyclotrisiloxane has been consumed. In the case that the reaction temperature is in the range of 15° to 20° C. and the reaction time is suitably in the range of 10 to 20 hours. The unnecessarily prolonged reaction time is not preferable, since the molecular weight distribution expands.

The molecular weight of the polysiloxane can be easily controlled by adjusting amounts of the trialkylsilanol, which is the initiator, and hexamethylcyclotrisiloxane, in the case that the number of the dimethylsiloxane units is 2000 or less (number average molecular weight=about 150000 or less). In addition, when the number average molecular weight is greater, the control of the molecular weight can be accomplished by changing conditions for living polymerization.

As described above, number of the siloxane chains on the basis of the hydrosilyl group, is one in the general formula (IV) of the fourth feature of this invention, two in the general formula (V) of the sixth feature of this invention, and three in the general formula (VI) of the eighth feature of this invention, but the number of chains can be controlled by adjusting the number of chlorine atoms bonded to a silicon atom in the chlorosilane used which is represented by the general formula (IX)

wherein g is an interger of 1 to 3 and R is an alkyl group having 1 to 4 carbon atoms.

Incidentally, the aforesaid chlorosilane is what is used as a chain terminator after the trailkylsilanol has been anion polymerized.

When dialkylchlorosilane, in which the number of chlorine atoms in the general formula (IX) is one, is used as the chain terminator, the obtained compound has one siloxane chain on the basis of the hydrosilyl group, as shown in the general formula (IV) of the fourth feature of the invention. When alkyldichlorosilane, in which the number of the chlorine atom in the general formula (IX) is two, is used as the chain terminator, the obtained compound has two siloxane chains on the basis of the hydrosilyl group, as shown in the general formula (V) of the sixth feature of this invention. Furthermore, when trichlorosilane, in which the number of the chlorine atom in the general formula (IX) is three, is used as the chain terminator, the obtained compound has three siloxane chains on the basis of the hydrosilyl group, as shown in the general formula (VI) of the eighth feature of this invention.

Alternatively, the compounds represented by the general formula (IV) of the fourth feature of this invention, the general formula (V) of the sixth feature of this invention and the general formula (VI) of the eighth feature of this invention can be rapidly and easily obtained in the following manner: Several intermediates having different molecular weights and having fluorine substituents at the terminals thereof are previously prepared in the form of a terminal silanol represented by the general formula (I') used in the tenth feature of this invention, and a chlorosilane corresponding to the desired number of siloxane chains is reacted with the previously prepared intermediate, as in the tenth and the eleventh features of this invention. This is the greatest feature of the preparation process regarding the present invention.

Furthermore, when a chlorine catching compound is used in the above-mentioned reaction with the chlorosilane, this reaction can proceed more smoothly.

The siloxane compound having two or three siloxane chains, on the basis of the hydrosilyl group in which the length and the terminal substituents of the siloxane chains are different can be synthesized in the following manner: Compounds having the desired two or more substituents and the desired siloxane chain length are separately produced by anion polymerization at a desired ratio, and then unified, and chain termination is made by the use of an alkyldichlorosilane or trichlorosilane. When the siloxane compound having the same chain length and the two or more different substituents is synthesized, a mixture of two or more kinds of trialkylsilanols, which are initiators, in a desired ratio is used as an initiator in the anion polymerization, and the chain of the polymer is then terminated with the alkyldichlorosilane or trichlorosilane.

Now, reference will be made briefly to the process for preparing the compound of the present invention.

In the first place, tridecafluoro-1,1,2,2-tetrahydrooctyl) dimethylsilanol (XII) and hexamethylcyclotrisiloxane (XIII) are subjected to ring opening living polymerization in the presence of a butyl lithium catalyst, and afterward dimethylchlorosilane is added thereto as a chain terminator, thereby obtaining a polysiloxane compound having a desired average polymerization degree represented by the undermentioned formula (XVI).

Furthermore, the compound (XIV), obtained in the above-mentioned process, is treated with a weak acid such as acetic acid or calcareous water at room temperature so as to effect chain termination, whereby a compound represented by the undermentioned formula (XV) is obtained in which one terminal group of its molecular chain is a silanol. If the compound (XV) is substituted for the compound (XIV), a compound represented by the formula (XVI) can be prepared.

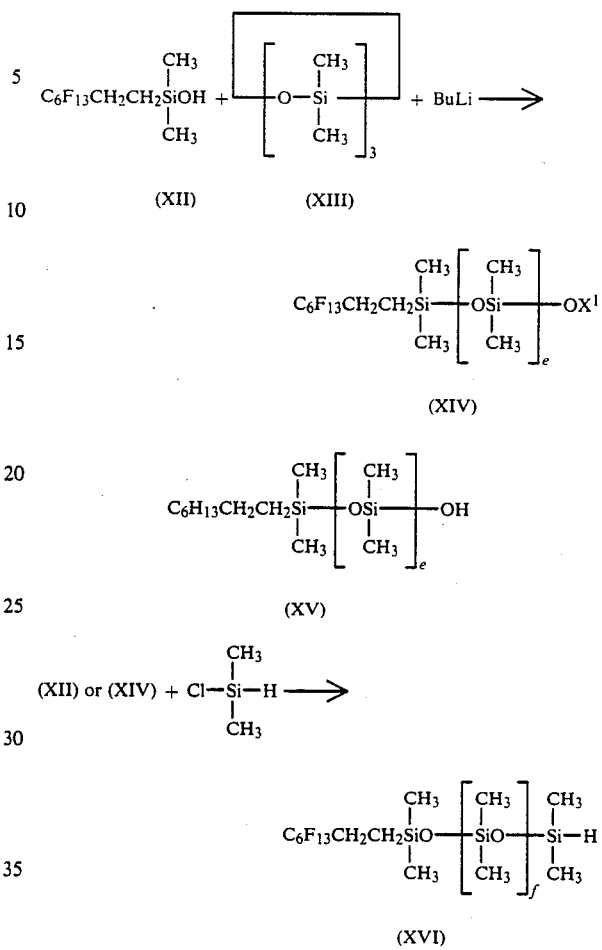

wherein Bu is a butyl group, $X^1$ is a hydrogen atom or a lithium atom, e is an integer of 1 to 1999, and f is an integer of 0 to 1999.

For the compound represented by the formula (XII), (XIV) or (XV) in the preparation process, methyldichlorosilane can be used in place of dimethylchlorosilane as the chain terminator, so that a polysiloxane compound represented by the formula (XVII) is obtained which has two siloxane chains on the basis of the hydroxilyl group.

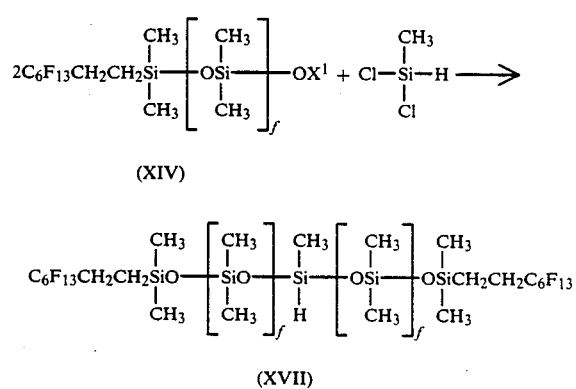

wherein $X^1$ is a hydrogen atom or a lithium atom, and f is an integer of 0 to 1999.

For the compound represented by the formula (XII), (XIV) or (XV) in the preparation process, trichlorosilane can be used as the chain terminator, so that a polysiloxane compound represented by the formula (XVIII) is easily obtained which has three siloxane chains on the basis of the hydrosilyl group.

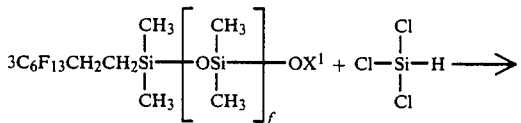

(XIV)

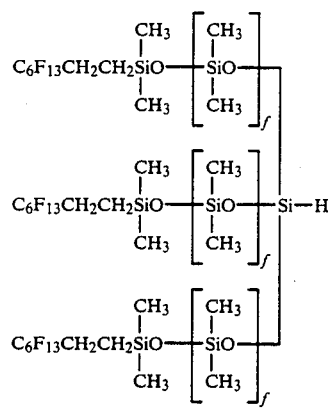

(XVIII)

wherein $X^1$ is a hydrogen atom or a lithium atom, and $f$ is an integer of 0 to 1999.

According to each process just described, the novel siloxane compound having the fluorine atom containing group at the α-position, the α-position or α'-position, or the α-position, α'-position or α"-position and having the hydrosilyl group at the ω-position can be prepared easily and inexpensively.

When the compound having a silanol group at the molecular chain terminal thereof according to the present invention is reacted with a synthetic resin such as a polyurethane or a polyester capable of reacting with this compound in order to incorporate it in the resin via a chemical bond, the following functional effects can be obtained.

(1) Since the reactive group in the compound of the present invention is chemically bonded to the polyurethane or the polyester, the synthetic resin incorporated with the compound of the present invention can inhibit the deterioration in characteristics with time.

(2) Since a fluoroalkyl group is present together with a dimethylsiloxane chain in one molecule, it is possible to provide the synthetic resin with various excellent specific functions of the fluorine atom-containing substituent, such as water repellency, stain resistance, release properties, non-adhesive properties, oil-repellent properties, low frictional properties and snow deposition resistance, which cannot be obtained from and is superior to a conventional polysiloxane terminated with trimethyl siloxy group, without impairing the characteristics of the polysiloxane.

(3) It is possible to obtain a very narrow molecular weight distribution (dispersity) of 1.1 to 1.2, and therefore, when the compound of the present invention having a uniform molecular chain length is introduced into a synthetic resin, the latter can take a more uniform structure than when a compound having an non-uniform molecular chain length is used. In addition, the synthetic process of the present invention by the utilization of living polymerization does not form any cyclic compounds of dimethylsiloxane which cannot be removed by any means, though a conventional equilibrating reaction using an acidic or basic catalyst cannot avoid the production of the cyclic compound Accordingly, the deterioration in physical properties and bleeding of the modified synthetic resins and scatter of product quality, which are attributable to these cyclic compounds, can be inhibited, so that the physical properties and the like can be improved.

(4) Also when the compound of the present invention is used as a graft polymer so as to improve characteristics of a synthetic resin, such as water repellency, stain resistance, release properties, non-adhesive properties, oil-repellent properties and low frictional properties, the synthetic resin can be provided with not only the function of the siloxane but also the specific function of the fluoroalkyl group. Furthermore, since the compound of the present invention is able to have a uniform molecular chain length, in that case the uniform structure can be obtained, and in addition the molecular chain lengths of the siloxane portion and the fluoroalkyl group portion can be changed so as to regulate the characteristics. In consequence, the compounds of the present invention can be applied to uses in which high performance is required, and in particular, it can be applied to the surface modification of a synthetic resin, to which uses the conventional dimethylsiloxane having no fluoroalkyl group cannot be applied.

When the compounds of the present invention having the hydrosilyl group at the terminal of the molecular chain are used to improve the characteristics of molded products and coated products of silicone rubbers, the density of fluoroalkyl groups are increased at the surface portions of these products as compared to the interiors thereof, because the fluoroalkyl group is present at the longest distance from the reactive group capable of chemically bonding to the silicone rubber or the like, and the degree of freedom of the fluoroalkyl group is higher than when the fluoroalkyl group is present on the pendant site. To sum up, the compounds of the present invention can obtain a great improvement in surface characteristics under the influence of a small amount of the fluoroalkyl group in contrast to conventional compounds in which the fluoroalkyl group exists only in the pendant portion, and the molecular chain length of the compounds according to the present invention can be altered so as to control the characteristics. Moreover, siloxane compounds having fluoroalkyl groups with more fluorine atoms can be synthesized more easily than compounds having the group in the pendant site, and when the fluoroalkyl groups are introduced into both the pendant portion and the molecular chain terminal, the silicone rubber possesses improved oil resistance and solvent resistance.

Since the compound of the present invention is able to have a very narrow molecular weight distribution (dispersity) of 1.1 to 1.2, when the compound is introduced into the synthetic resin, the latter can take a more uniform structure than when a compound having a non-uniform molecular chain length is used. In addition, the synthetic process of the present invention by the utilization of living polymerization does not form any cyclic compounds of dimethylsiloxane which cannot be removed by any means, though an equilibrating reaction using an acidic or basic catalyst cannot avoid the production of cyclic compounds. Accordingly, the deterioration in physical properties and bleeding of the modified synthetic resins and scatter of product quality, which are attributable to these cyclic compounds can be inhibited, so that the physical properties and the like can be improved.

When the compounds of the present invention, having the hydrosilyl group at the terminal thereof are introduced into an α-polyolefin synthetic resin, and when in place of a conventional one terminal-modified polysiloxane compound not having any reactive group and fluoroalkyl group in one molecule, the compound of the present invention having the hydrosilyl group portion, to which the reactive group capable of bonding to the desired synthetic resin has been added by a hydrosilyl-forming treatment, is introduced into the synthetic resin so as to improve the specific characteristics of the resin, the following effects can be obtained.

(1) Since the reactive group in the compound of the present invention is chemically bonded to the synthetic resin, the synthetic resin incorporated with the compound of the present invention can inhibit the deterioration in characteristics with time.

(2) Since the fluoroalkyl group is present together with the dimethylsiloxane chain in one molecule, it is possible to provide the synthetic resin with various excellent specific functions of the fluorine atom-containing substituent such as water repellency, stain resistance, release properties, non-adhesive properties, oil-repellent properties, low frictional properties and snow deposition resistance, which cannot be obtained from and is superior to the conventional polysiloxane terminated with trimethyl siloxy group without impairing the characteristics of the polysiloxane.

(3) It is possible to obtain a very narrow molecular weight distribution (dispersity) of 1.1 to 1.2, and therefore, when the compound of the present invention having a uniform molecular chain length is introduced into the synthetic resin, the latter can take a more uniform structure than when a compound having a non-uniform molecular chain length is used. In addition, the synthetic process of the present invention by the utilization of living polymerization does not form any cyclic compounds of dimethylsiloxane which cannot be removed by any means, though a conventional equilibrating reaction using an acidic or basic catalyst cannot avoid the production of the cyclic compounds. Accordingly, the deterioration in physical properties and bleeding of the modified synthetic resins and scatter of product quality, which are attributable to these cyclic compounds, can be inhibited, so that the physical properties and the like can be improved.

(4) Also when the compound of the present invention is used as a graft polymer so as to improve characteristics of a synthetic resin such as water repellency, stain resistance, release properties, non-adhesive properties, oil-repellent properties and low frictional properties, the synthetic resin can be provided with not only the function of the siloxane but also the specific function of the fluoroalkyl group. Furthermore, since the compounds of the present invention are able to have a uniform molecular chain length in that case, the uniform structure can be obtained, and in addition the molecular chain lengths of the siloxane portion and the fluoroalkyl group portion can be changed so as to regulate the characteristics. In consequence, the compound of the present invention can be applied to uses in which high performance is required, and in particular, it can be applied to the surface modification of the synthetic resin, to which uses the conventional dimethylsiloxane having no fluoroalkyl group cannot be applied.

(5) In the compounds of the present invention, three conditions can be optionally selected which are the number of the 1 to 3 siloxane chains on the basis of the hydrosilyl group which is reactive to the synthetic resin, the length of the siloxane chains, and the kind of fluorine atom-containing substituent at the terminal of the siloxane chain. When the compound of the present invention having the three required conditions is introduced into the desired synthetic resin or silicone rubber, finely controlled functions and characteristics can be given to the resin or the like.

Moreover, when the compound of the present invention is synthesized in accordance with the process of the present invention, the following effects can be obtained.

(1) Since the amount of the expensive lithium catalyst in the present invention is ½ to 1/200 of the necessary amount in the conventional process, the siloxane compound having a low molecular weight can be manufactured at low cost, though the conventional process requires a great deal of the catalyst to manufacture such a kind of siloxane compound. Accordingly, the process of the present invention permits applying low-molecular polysiloxane compounds to uses in which expensive siloxane compounds has not been accepted from an economical viewpoint. In addition, a smaller amount of metallic lithium or an alkyllithium compound, which is dangerous is handled, and thus safety is improved.

(2) In the process of the present invention, a trialkylsilanol can be used as a polymerization initiator. Therefore, the step of previously preparing lithium trialkylsilanolate, which the conventional process requires, is not necessary any more, with the result that equipment investment can be decreased, which permits a supply of inexpensive products.

(3) The polysiloxane compound synthesized by the process of the present invention is densely composed of molecules containing dimethylsiloxane units which increase one by one, and therefore, when the polysiloxane compound of the present invention is used to provide the synthesized resin or silicone rubber with necessary functions, the compound can be more uniformly incorporated in the synthetic resin or the silicone rubber than a conventional polymer composed of molecules each containing repeating units which vary three by three, whereby the characteristics of the resin or the rubber can be improved.

The drawings attached hereto have been described hereinbefore, but they can be summarized as follows:

FIGS. 1 and 2 show gel permeation chromatography grams of siloxane compounds having a molecular weight of 1000 which were synthesized by the preparation process of the present invention (the lithium catalyst was used in an amount of 1.0 mole % based on a trialkylsilanol) and a conventional manufacturing process (the trialkylsilanol and the lithium catalyst were each used in an equimolar amount) under the same conditions except for amounts of the catalysts FIGS. 3 and 4 are gas chromatograms of compounds which correspond to those of FIGS. 1 and 2.

Peaks one to five in FIGS. 3 and 4 correspond to the following compounds:

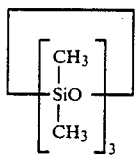

(1)

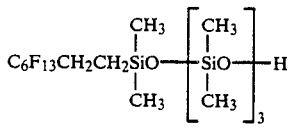

(2)

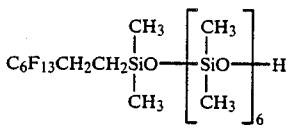

(3)

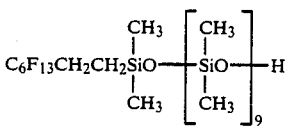

(4)

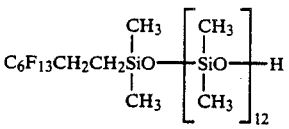

(5)

EXAMPLES

Now, the present invention will be described in detail with reference to examples, but the scope of the present invention should not be limited to these examples

EXAMPLE 1

Preparation of 1-(tridecafluoro-1,1,2,2-tetrahydrooctyl)-9-hydrodecamethylpentasiloxane:

To a 1-liter three-necked round bottom flask equipped with a stirrer and a cooling device were fed 100 ml of previously dried tetrahydrofuran, 100.0 g (0.238 mole) of (tridecafluoro-1,1,2,2-tetrahydrooctyl)-dimethylsilanol and 52.9 g (0.238 mole) of hexamethylcyclotrisiloxane with an $N_2$ stream, and 0.79 ml (1.5 mole/l) of a butyl lithium hexane solution was then added thereto and polymerization was performed at 20° C. for 10 hours.

Next, 24.7 g (0.261 mole) of dimethylchlorosilane was further added thereto, followed by stirring for 1 hour in order to bring the polymerization to an end. The thus synthesized material was then transferred into a separatory funnel, then washed with water to remove the resulting lithium chloride therefrom, and dried with anhydrous sodium sulfate.

Afterward, low-boiling substances in the resulting reaction product were distilled off under conditions of 100° C. and 100 mmHg over 2 hours, thereby obtaining the desired siloxane compound in a substantially quantitative yield With regard to the thus obtained siloxane compound analytical results of $^1$H-NMR spectrum, IR spectrum and GPC (gel permeation chromatography) as well as quantitative data of an Si-H group were as follows, and it was confirmed that the obtained siloxane compound had the following structure

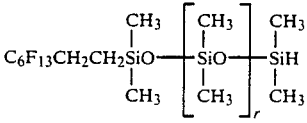

$^1$H-NMR(CDCl$_3$): δppm
0.18 (Si(CH$_3$)$_2$, s, 30H)
0.53–2.80 (SiCH$_2$CH$_2$, broad, 4H)
4.55 (Si—H, m, 1H)
IR (KBr):
2970 cm$^{-1}$ (C-H)
2250 cm$^{-1}$ (Si-H)
1260 cm$^{-1}$ (Si-CH$_3$)
1250–1150 cm$^{-1}$ (CF$_2$, CF$_3$)
1120–1050 cm$^{-1}$ (Si-O)

Molecular weight in terms of polystyrene by the use of GPC (toluene):

| | |
|---|---|
| Number average molecular weight (Mn) | 850 |
| Weight average molecular weight (Mw) | 930 |
| Dispersity (Mw/Mn) | 1.1 |
| (molecular weight on calculated values was 702) | |
| Quantitative data of Si—H group: | |
| H (ppm) | 1442 (ppm) |
| Molecular weight calculated on H (ppm) | 693 |

EXAMPLE 2

Preparation of a dimethylpolysiloxane having a tridecafluoro-1,1,2,2-tetrahydrooctyl group at the α-position and a hydrosilyl group at the ω-position:

To a 2-liter three-necked round bottom flask equipped with a stirrer and a cooling device were fed 400 ml of previously dried tetrahydrofuran, 5.0 g (0.0119 mole) of (tridecafluoro-1,1,2,2-tetrahydrooctyl)dimethylsilanol and 350.5 g (1.57 moles) of hexamethylcyclotrisiloxane with an $N_2$ stream, and 0.040 ml (1.5 moles/l) of a hexane solution of butyl lithium was then added thereto and polymerization was performed at 20° C. for 15 hours.

Next, 1.24 g (0.0131 mole) of dimethylchlorosilane was further added thereto, followed by stirring for 1 hour in order to bring the polymerization to an end. The thus synthesized material was then transferred into a separatory funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining the desired siloxane compound in a substantially quantitative yield. With regard to the thus obtained siloxane compound, analytical results of IR spectrum, GPC (gel permeation chromatography) and viscosity as well as quantitative data of an Si-H group were as follows IR (KBr):
2970 cm$^{-1}$ (C-H)
2250 cm$^{-1}$ (Si-H)
1260 cm$^{-1}$ (Si-CH$_3$)
1250–1150 cm$^{-1}$ (CF$_2$, CF$_3$)
1120–1050 cm$^{-1}$ (Si-O)

Molecular weight in terms of polystyrene by the use of GPC (toluene):

| | |
|---|---|
| Number average molecular weight (Mn) | 32660 |
| Weight average molecular weight (Mw) | 35930 |
| Dispersity (Mw/Mn) | 1.1 |

Quantitative data of Si-H group:

| | |
|---|---|
| H (ppm) | 32.1 (ppm) |
| Molecular weight calculated on H (ppm) | 31153 |

Viscosity (25° C.):
1385 centipoise

EXAMPLE 3

Preparation of a dimethylpolysiloxane having a tridecafluoro-1,1,2,2-tetrahydrooctyl group at the α-position and a hydrosilyl group at the ω-position:

To a 5-liter three-necked round bottom flask equipped with a stirrer and a cooling device were fed 2000 ml of previously dried tetrahydrofuran, 12.0 g (0.0285 mole) of (tridecafluoro-1,1,2,2-tetrahydrooctyl)dimethylsilanol and 1981.1 g (8.90 moles) of hexamethylcyclotrisiloxane with an $N_2$ stream, and 0.095 ml (1.5 moles/l) of a butyl lithium hexane solution was then added thereto and polymerization was performed at 20° C. for 20 hours Next, 2.97 g (0.0313 mole) of dimethylchlorosilane was further added thereto, followed by stirring for 1 hour in order to bring the polymerization to an end. The thus synthesized material was then transferred into a separatory funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining the desired siloxane compound in a substantially quantitative yield. With regard to the thus obtained siloxane compound, analytical results of IR spectrum, GPC (gel permeation chromatography) and viscosity as well as quantitative data of an Si-H group were as follows:

IR (KBr):
2970 cm$^{-1}$ (C-H)
2250 cm$^{-1}$ (Si-H)
1260 cm$^{-1}$ (Si-CH$_3$)
1250-1150 cm$^{-1}$ (CF$_2$, CF$_3$)
1120-1050 cm$^{-1}$ (Si-O)

Molecular weight in terms of polystyrene by the use of GPC (toluene):

| | |
|---|---|
| Number average molecular weight (Mn) | 63410 |
| Weight average molecular weight (Mw) | 75930 |
| Dispersity (Mw/Mn) | 1.2 |

Quantitative data of Si-H group

| | |
|---|---|
| H (ppm) | 15.1 (ppm) |
| Molecular weight calculated on H (ppm) | 66225 |
| Viscosity (25° C.): | |

Viscosity (25° C.):
3538 centipoise

EXAMPLE 4

Preparation of a dimethylpolysiloxane having a heptadecafluoro-1,1,2,2-tetrahydrodecyl group at the α-position and a hydrosilyl group at the ω-position:

To a 5-liter three-necked round bottom flask equipped with a stirrer and a cooling device were fed 2000 ml of previously dried tetrahydrofuran, 100.0 g (0.1915 mole) of (heptadecafluoro-1,1,2,2-tetrahydrodecyl)dimethylsilanol and 1803.6 g (8.10 moles) of hexamethylcyclotrisiloxane with an $N_2$ stream, and 0.64 ml (1.5 moles/l) of a hexane solution of butyl lithium was then added thereto and polymerization was performed at 20° C. for 15 hours.

Next, 19.9 g (0.211 mole) of dimethylchlorosilane was further added thereto, followed by stirring for 1 hour in order to bring the polymerization to an end. The thus synthesized material was then transferred into a separatory funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining the desired siloxane compound in a substantially quantitative yield. With regard to the thus obtained siloxane compound, analytical results of IR spectrum, GPC (gel permeation chromatography) and viscosity as well as quantitative data of an Si-H group were as follows:

IR (KBr):
2970 cm$^{-1}$ (C-H)
2250 cm$^{-1}$ (Si-H)
1260 cm$^{-1}$ (Si-CH$_3$)
1250-1150 cm$^{-1}$ (CF$_2$, CF$_3$)
1120-1050 cm$^{-1}$ (Si-O)

Molecular weight in terms of polystyrene by the use of GPC (toluene):

| | |
|---|---|
| Number average molecular weight (Mn) | 11710 |
| Weight average molecular weight (Mw) | 12896 |
| Dispersity (Mw/Mn) | 1.1 |

Quantitative data of Si-H group:

| | |
|---|---|
| H (ppm) | 103.3 (ppm) |
| Molecular weight calculated on H (ppm) | 9680 |

Viscosity (25° C.):
147 centipoise

EXAMPLE 5

Preparation of a dimethylpolysiloxane having a 3,3,3-trifluoropropyl group at the α-position and a hydrosilyl group at the ⅔-position:

To a 2-liter three-necked round bottom flask equipped with a stirrer and a cooling device were fed 800 ml of previously dried tetrahydrofuran, 10.0 g (0.581 mole) of (3,3,3-trifluoropropyl)dimethylsilanol and 567.2 g (2.55 moles) of hexamethylcyclotrisiloxane with an $N_2$ stream, and 0.19 ml (1.5 moles/l) of a hexane solution of butyl lithium was then added thereto and polymerization was performed at 20° C. for 15 hours.

Next, 6.04 g (0.0639 mole) of dimethylchlorosilane was further added thereto, followed by stirring for 1 hour in order to bring the polymerization to an end. The thus synthesized material was then transferred into a separatory funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining the desired siloxane compound in a substantially quantitative yield With regard to the thus obtained siloxane compound, analytical results of IR spectrum, GPC (gel permeation chromatography) and viscosity as well as quantitative data of an Si-H group were as follows:

IR (KBr):
2970 cm$^{-1}$ (C-H)
2250 cm$^{-1}$ (Si—H)
1260 cm$^{-1}$ (Si—CH$_3$)
1250-1150 cm$^{-1}$ (CF$_3$)
1120-1050 cm$^{-1}$ (Si—O)

Molecular weight in terms of polystyrene by the use of GPC (toluene):

| Number average molecular weight (Mn) | 9520 |
|---|---|
| Weight average molecular weight (Mw) | 10490 |
| Dispersity (Mw/Mn) | 1.1 |

Quantitative data of Si-H group:

| H (ppm) | 112.5 (ppm) |
|---|---|
| Molecular weight calculated on H (ppm) | 8890 |

Viscosity (25° C.):
116 centipoise

EXAMPLE 6

Preparation of a dimethylpolysiloxane having a pentafluorophenyl group at the α-position and a hydrosilyl group at the ω-position:

To a 1-liter three-necked round bottom flask equipped with a stirrer and a cooling device were fed 100 ml of previously dried tetrahydrofuran, 10.0 g (0.04127 mole) of pentafluorophenyldimethylsilanol and 194.0 g (0.138 mole) of hexamethylcyclotrisiloxane with an N$_2$ stream, and 0.14 ml (1.5 moles/l) of a hexane solution of butyl lithium was then added thereto and polymerization was performed at 20° C. for 15 hours.

Next, 4.29 g (0.0454 mole) of dimethylchlorosilane was further added thereto, followed by stirring for 1 hour in order to bring the polymerization to an end. The thus synthesized material was then transferred into a separatory funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining the desired siloxane compound in a substantially quantitative yield. With regard to the thus obtained siloxane compound, analytical results of IR spectrum, GPC (gel permeation chromatography) and viscosity as well as quantitative data of an Si—H group were as follows:

IR (KBr):
2970 cm$^{-1}$ (C—H)
2250 cm$^{-1}$ (Si—H)
1260 cm$^{-1}$ (Si—CH$_3$)
1120-1050 cm$^{-1}$ (Si-O)

Molecular weight in terms of polystyrene by the use of GPC (toluene):

| Number average molecular weight (Mn) | 5807 |
|---|---|
| Weight average molecular weight (Mw) | 6370 |
| Dispersity (Mw/Mn) | 1.1 |

Quantitative data of Si-H group:

| H (ppm) | 203.3 (ppm) |
|---|---|
| Molecular weight calculated on H (ppm) | 4920 |

Viscosity (25° C.):
64 centipoise

EXAMPLE 7

Preparation of a dimethylpolysiloxane having a tridecafluoro-1,1,2,2-tetrahydrooctyl group at the α-position and a silanol group at the ω-position:

To a 5-liter three-necked round bottom flask equipped with a stirrer and a cooling device were fed 1000 ml of previously dried tetrahydrofuran, 50.0 g (0.119 mole) of (tridecafluoro-1,1,2,2-tetrahydrooctyl)-dimethylsilanol and 1130.2 g (5.08 moles) of hexamethylcyclotrisiloxane with an N$_2$ stream, and 0.40 ml (1.5 moles/l) of a hexane solution of butyl lithium was then added thereto and polymerization was performed at 20° C. for 15 hours.

Next, acetic acid was further added thereto, followed by stirring for 1 hour. The thus synthesized material was then transferred into a separatory funnel, then washed with water, and dried with anhydrous sodium sulfate Afterward, low-boiling substances in the resulting reaction product were distilled off under conditions of 100° C. and 10 mmHg over 2 hours, thereby obtaining the desired siloxane compound in a substantially quantitative yield. With regard to the thus obtained siloxane compound, analytical results of IR spectrum, GPC (gel permeation chromatography) and viscosity as well as quantitative data of an Si-H group were as follows: IR (KBr):
3200-3400 cm$^{-1}$ (Si—OH)
2970 cm$^{-1}$ (C-H)
1260 cm$^{-1}$ (Si-CH$_3$)
1250-1150 cm$^{-1}$ (CF$_2$, CF$_3$)
1120-1050 cm$^{-1}$ (Si—O)

Molecular weight in terms of polystyrene by the use of GPC (toluene):

| Number average molecular weight (Mn) | 10850 |
|---|---|
| Weight average molecular weight (Mw) | 12020 |
| Dispersity (Mw/Mn) | 1.1 |

Qantitative data of OH group

| OH (wt %) | 0.18 (wt %) |
|---|---|
| Molecular weight calculated on OH (wt %) | 9444 |

Viscosity (25° C.):
154 centipoise

EXAMPLE 8

Preparation of a dimethylpolysiloxane having a tridecafluoro-1,1,2,2-tetrahydrooctyl group at the α-position and a hydrosilyl group at the ω-position: To a 5-liter three-necked round bottom flask equipped with a stirrer and a cooling device were fed 1000 ml of previously dried tetrahydrofuran, 50.0 g (0.119 mole) of (tridecafluoro-1,1,2,2-tetrahydrooctyl)dimethylsilanol and 1130.2 g (5.08 moles) of hexamethylcyclotrisiloxane with an N₂ stream, and 0.40 ml (1.5 moles/l) of a hexane solution of butyl lithium was then added thereto and polymerization was performed at 20° C. for 15 hours.

Next, 12.35 g (0.1306 mole) of dimethylchlorosilane was further added thereto, followed by stirring for 1 hour in order to bring the polymerization to an end. The thus synthesized material was then transferred into a separatory funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining the desired siloxane compound in a substantially quantitative yield With regard to the thus obtained siloxane compound, analytical results of IR spectrum, GPC (gel permeation chromatography) and viscosity as well as quantitative data of an Si-H group were as follows:

IR (KBr):
2970 cm⁻¹ (C—H)
2250 cm⁻¹ (Si—H)
1260 cm⁻¹ (Si—CH₃)
1250–1150 cm⁻¹ (CF₂, CF₃)
1120–1050 cm⁻¹ (Si—O)

Molecular weight in terms of polystyrene by the use of GPC (toluene):

| | |
|---|---|
| Number average molecular weight (Mn) | 11910 |
| Weight average molecular weight (Mw) | 12850 |
| Dispersity (Mw/Mn) | 1.1 |

Quantitative data of Si-H group:

| | |
|---|---|
| H (ppm) | 101.6 (ppm) |
| Molecular weight calculated on H (ppm) | 9843 |

Viscosity (25° C.):
165 centipoise

EXAMPLE 9

Preparation of a dimethylpolysiloxane (the number of siloxane chains on the basis of a hydrosilyl group was 2) having a tridecafluoro-1,1,2,2-tetrahydrooctyl group at the α-position and α'-position and a hydrosilyl group at the ω-position:

To a 5-liter three-necked round bottom flask equipped with a stirrer and a cooling device were fed 1000 ml of previously dried tetrahydrofuran, 50.0 g (0.119 mole) of (tridecafluoro-1,1,2,2-tetrahydrooctyl)dimethylsilanol and 1130.2 g (5.08 moles) of hexamethylcyclotrisiloxane with an N₂ stream, and 0.40 ml (1.5 moles/l) of a hexane solution of butyl lithium was then added thereto and polymerization was performed at 20° C. for 15 hours.

Next, 7.51 g (0.0653 mole) of methyldichlorosilane was further added thereto, followed by stirring for 1 hour in order to bring the polymerization to an end. The thus synthesized material was then transferred into a separatory funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining the desired siloxane compound in a substantially quantitative yield With regard to the thus obtained siloxane compound, analytical results of IR spectrum, GPC (gel permeation chromatography) and viscosity as well as quantitative data of an Si—H group were as follows Furthermore, it was confirmed that the obtained siloxane compound had two siloxane chains on the basis of the hydrosilyl group in which s and t in the following formula had about the same value, judging from the fact that molecular weights obtained from the GPC data and H (ppm) were about twice as much as those in Example 8 (the number of siloxane chains on the basis of a hydrosilyl group was 1) in which the same conditions as in this example were repeated on the identical scale with the exception that only the kind of chlorosilane was changed.

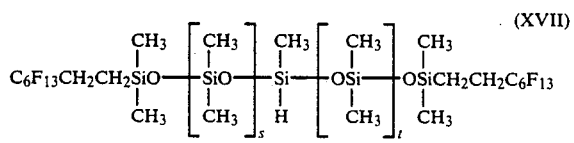
(XVII)

IR (KBr):
2970 cm⁻¹ (C—H)
2250 cm⁻¹ (Si—H)
1260 cm⁻¹ (Si—CH₃)
1250–1150 cm⁻¹ (CF₂, CF₃)
1120–1050 cm⁻¹ (Si—O)

Molecular weight in terms of polystyrene by the use of GPC (toluene):

| | |
|---|---|
| Number average molecular weight (Mn) | 19740 |
| Weight average molecular weight (Mw) | 23720 |
| Dispersity (Mw/Mn) | 1.2 |

Quantitative data of Si-H group:

| | |
|---|---|
| H (ppm) | 53.9 (ppm) |
| Molecular weight calculated on H (ppm) | 18550 |

Viscosity (25° C.):
423 centipoise

EXAMPLE 10

Preparation of a dimethylpolysiloxane (the number of siloxane chains on the basis of a hydrosilyl group was 3) having a tridecafluoro-1,1,2,2-tetrahydrooctyl group at the α-position, α'-position and α''-position and a hydrosilyl group at the ω-position:

To a 5-liter three-necked round bottom flask equipped with a stirrer and a cooling device were fed 1000 ml of previously dried tetrahydrofuran, 50.0 g (0.119 mole) of (tridecafluoro-1,1,2,2-tetrahydrooctyl)-dimethylsilanol and 1130.2 g (5.08 moles) of hexamethylcyclotrisiloxane with an N₂ stream, and 0.40 ml (1.5 moles/l) of a hexane solution of butyl lithium was then added thereto and polymerization was performed at 20° C. for 15 hours Next, 5.90 g (0.0435 mole) of trichlorosilane was further added thereto, followed by stirring for 1 hour in order to bring the polymerization to an end. The thus synthesized material was then transferred into a separatory funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining the desired siloxane compound in a substantially quantitative yield. With regard to the thus obtained siloxane compound, analytical results of IR spectrum, GPC (gel permeation chromatography) and viscosity as well as quantitative data of an Si—H group were as follows Furthermore, it was confirmed that the obtained siloxane compound had three siloxane chains on the basis of the hydrosilyl group in which u, v and w in the following formula had about the same value, judging from the fact that moleculare weights obtained from the GPC data and H (ppm) were about thrice as much as those in Example 8 (the number of siloxane chains on the basis of hydrosilyl group was 1) in which the same conditions as in this example were repeated on the identical scale with the exception that the kind of chlorosilane was only changed.

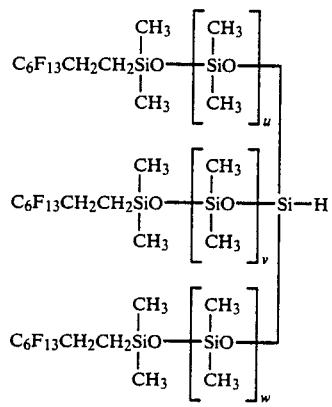

IR (KBr):
2970 cm$^{-1}$ (C—H)
2250 cm$^{-1}$ (Si—H),
1260 cm$^{-1}$ (Si—CH$_3$)
1250–1150 cm$^{-1}$ (CF$_2$, CF$_3$)
1120–1050 cm$^{-1}$ (Si—O)

Molecular weight in terms of polystyrene by the use of GPC (toluene):

| | |
|---|---|
| Number average molecular weight (Mn) | 33790 |
| Weight average molecular weight (Mw) | 37710 |
| Dispersity (Mw/Mn) | 1.1 |

Quantitative data of Si-H group:

| | |
|---|---|
| H (ppm) | 33.8 (ppm) |
| Molecular weight calculated on H (ppm) | 29590 |

Viscosity (25° C.):
681 centipoise

What is claimed is:

1. A siloxane compound represented by the general formula (I)

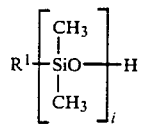

wherein i is an integer of 4 to 2000, and R$^1$ is a pentafluorophenyl group or a substituent which is a straight-chain or a branched fluoroalkyl group represented by the formula (II)

$$C_aH_bF_{2a-b+1} \quad \text{(II)}$$

wherein a is an integer of 3 to 18, and b is an integer of 0 to 2a.

2. A siloxane compound according to claim 1 wherein said substituent represented by R$^1$ in said general formula (I) comprises a 3,3,3-trifluoropropyl group.

3. A process for preparing a siloxane compound represented by said general formula (I) described in claim 1 which comprises anion polymerizing hexamethylcyclotrisiloxane with a trialkylsilanol represented by the general formula (III)

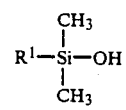

wherein R$^1$ is a pentafluorophenyl group or a substituent which is a straight-chain or a branched fluoroalkyl group represented by the formula (II)

$$C_aH_bF_{2a-b+1} \quad \text{(II)}$$

wherein a is an integer of 3 to 18, and b is an integer of 0 to 2a, as an initiator in the presence of a lithium catalyst in an amount of 0.05 to 50 mole % based on said initiator in a polar solvent having no active hydrogen.

4. A process for preparing a siloxane compound according to claim 3 wherein said lithium catalyst is metallic lithium, butyl lithium, lithium hydroxide, a lithium trialkylsilanolate represented by the general formula (XI)

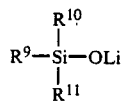

wherein each of R$^9$, R$^{10}$ and R$^{11}$ is an alkyl group having 1 to 4 carbon atoms, a phenyl group, a pentafluorophenyl group, or a straight-chain or a branched fluoroalkyl group represented by the formula (II)

$$C_aH_bF_{2a-b+1} \quad \text{(II)}$$

wherein a is an integer of 3 to 18, and b is an integer of 0 to 2a, or a mixture of two or more thereof 5. A process for preparing a siloxane compound according to claim 3, wherein the amount of said lithium catalyst is in the range of 0.05 to 10 mole % based on said trialkylsilanol which is said polymerization initiator.

6. A process for preparing a siloxane compound according to claim 3, wherein said polar solvent having no active hydrogen is tetrahydrofuran, 1,4-dioxane, ethylene glycol dimethyl ether, diethylene glycol dimethyl ether, dimethylformamide, dimethyl sulfoxide or a mixture of two or more thereof.

7. A process for preparing a siloxane compound according to claim 4 wherein the amount of said lithium catalyst is in the range of 0.05 to 10 mole % based on said trialkylsilanol which is said polymerization initiator.

8. A process for preparing a siloxane compound according to claim 4 wherein said polar solvent having no active hydrogen is tetrahydrofuran, 1,4-dioxane, ethylene glycol dimethyl ether, diethylene glycol dimethyl ether, dimethylformamide, dimethyl sulfoxide or a mixture of two or more thereof.

9. A siloxane compound according to claim 1 wherein said substituent represented in said general formula (I) comprises a tridecafluoro 1,1,2,2-tetrahydrooctyl group.

10. A siloxane compound according to claim 1 wherein said substituent represented in said general formula (I) comprises a heptadecafluoro-1,1,2,2-tetrahydrodecyl group.

11. A process for preparing a siloxane compound according to claim 3 wherein said substituent represented in said general formula (I) comprises a 3,3,3-trifluoropropyl group.

12. A process for preparing a siloxane compound according to claim 3 wherein said substituent represented in said general formula (I) comprises a tridecafluoro-1,1,2,2-tetrahydrooctyl group.

13. A process for preparing a siloxane compound according to claim 3 wherein said substituent represented in said general formula (I) comprises a heptadecafluoro-1,1,2,2-tetrahydrodecyl group.

14. A process for preparing a siloxane compound according to claim 3 wherein said lithium catalyst comprises butyl lithium.

15. A process for preparing a siloxane compound according to claim 3 wherein said polar solvent comprises tetrahydrofuran.

* * * * *

UNITED STATES PATENT AND TRADEMARK OFFICE
CERTIFICATE OF CORRECTION

PATENT NO. : 4,992,521

DATED : February 12, 1991

INVENTOR(S) : Saho et al.

It is certified that error appears in the above-identified patent and that said Letters Patent is hereby corrected as shown below:

On the title page, in item [57]:

In the Abstract, line 11, change "formula (III)" to --formula (II)--.

Signed and Sealed this

Eleventh Day of August, 1992

Attest:

DOUGLAS B. COMER

*Attesting Officer*  *Acting Commissioner of Patents and Trademarks*